Feb. 22, 1955  C. G. BENSINGER  2,702,642
ARTICLE SPACER FOR USE WITH LIFTING FORKS
Filed June 17, 1953

Inventor
CLARENCE G. BENSINGER

By Rule & Hoge
Attorneys

United States Patent Office 2,702,642
Patented Feb. 22, 1955

2,702,642

ARTICLE SPACER FOR USE WITH LIFTING FORKS

Clarence G. Bensinger, Toledo, Ohio, assignor to Owens-Illinois Glass Company, a corporation of Ohio Application June 17, 1953, Serial No. 362,238

9 Claims. (Cl. 214—10.5)

My invention relates to the stacking, lifting and transportation of articles by means of a powered lifting fork. In handling large numbers of rectangular articles, including cartons, building blocks and the like, it is common practice to build them into self-sustaining groups or piles, permitting a large number of the articles to be lifted and moved as a unit by a so-called lifting fork without disturbing the relative positions of the articles. The lifting fork comprises a powered truck having a series of horizontal arms which can be lowered close to the ground and slid or moved forward lengthwise beneath a pile or group of the articles which form the load. The arms can be lifted and lowered with the load of articles on them, permitting transfer of the articles to or from a truck for transportation or stacking or unstacking of the articles in units without disturbing the relative positions or arrangement of the articles in the unit.

In building a group or stack of the articles, it is common practice to arrange the articles forming the lowermost course in rows spaced apart to accommodate the arms of the lifting fork, permitting them to be brought into lifting position beneath the pile or stack. In one type of lifting fork the arms are provided with laterally expansible means for gripping the articles forming the lower course of the pile so that they will be frictionally held and lifted as an integral part of the load. In this manner the pile of articles may be transferred, for example, to a truck or from a truck and stacked in a warehouse by the lifting fork without disturbing the relative positions of the articles so that the pile of articles may thereafter be again picked up and transported by the lifting fork.

In this method of handling such articles, a difficulty which has been experienced is the shifting of the load due to the spacing of the articles and the difficulty of maintaining the spaced articles in their proper relative positions. Shifting of the articles interferes with the positioning of the lifting fork arms beneath the load. The present invention provides a novel method and means for spacing the articles and maintaining them in their spaced relation. More specifically, the invention provides spacing tubes of a size and shape to receive the lifting fork arms and which facilitate the proper spacing of the articles and hold them in their spaced relation. The spacing tubes are expansible laterally for transmitting pressure from the expansible gripping devices on the fork arms, thus causing the spacing tubes to grip the articles and hold them during the lifting and transportation of the stacked articles.

Referring to the accompanying drawings.

Figure 1:
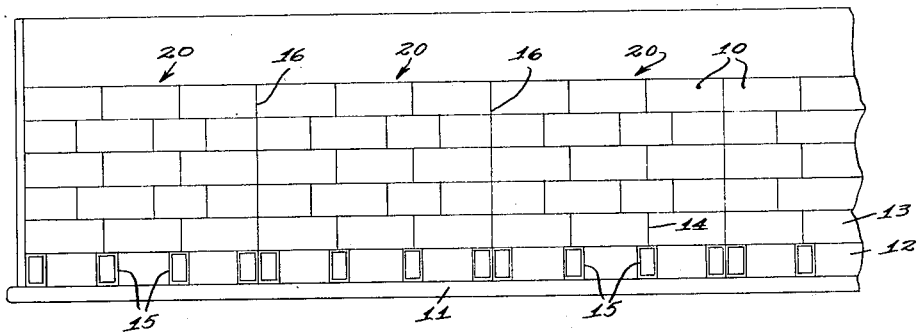
Fig. 1 is an elevational view, partly diagrammatic, of articles stacked in groups or multiple units.
Figure 2:
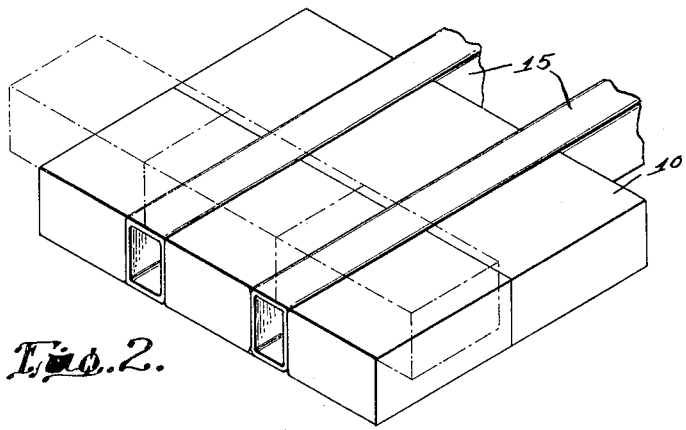
Fig. 2 is a perspective view showing the relation of the spacing tubes and articles.

Referring to the drawings, the articles 10 which are stacked or built up in piles or groups for transportation or storage may be cartons such as commonly used for packing various commodities and are so referred to herein, although the invention is not limited to the use of such articles. Any articles of rectangular or regular form suitable for building up into integrated piles, stacks or groups of self-sustaining formation may be used with the present invention. Each such pile or group forms an integrated unit comprised of a multiplicity of the articles. As shown in Fig. 1, the articles 10 are built up in mutiple-unit piles or groups 20 on a base or platform 11 which may be, for example, the floor of a truck. The bottom course 12 of each group 20 consists of rows of the articles 10, the rows spaced apart with spacing tubes 15 between the rows. The cartons as shown are of greater length than width, those forming the lower course being placed end to end in rows parallel with the tubes. In the second course 13 the cartons are positioned with the longer sides extending transversely of the spacing tubes, the length of each carton being equal to the distance between centers of adjacent spacing tubes and with the end edges 14 of the cartons directly over the spacing tubes. As shown in Fig. 1, a plurality of the piles or groups 20 are built side by side on the platform 11, the adjoining sides of the groups as a whole abutting in vertical planes 16.

The spacing tubes or sleeves 15 may be made of fiberboard, a double wall or double faced fiberboard, or of a light metal, plastic or other material. The particular material most suitable depends largely on the characteristics such as weight and size of the articles with which they are used. A double wall or double faced fiberboard tube or sleeve gives the first course of cartons a solid formation which prevents shifting during transportation. As herein shown, the tubes are rectangular in cross-section, the depth of the tube being substantially equal to that of the cartons so that the tubes give direct support to the overlying cartons. The vertical side walls of the tubes facilitate the building and even spacing of the articles in the first course 12, and serve positively to prevent any shifting or movement of the cartons out of line. Although the spacing elements 15 are shown as rectangular sleeves or tubes, other forms of tubes could be used. It will also be understood that the spacing devices are not necessarily in the form of tubes, although the form herein shown has important and obvious advantages over other forms.

Figure 5:
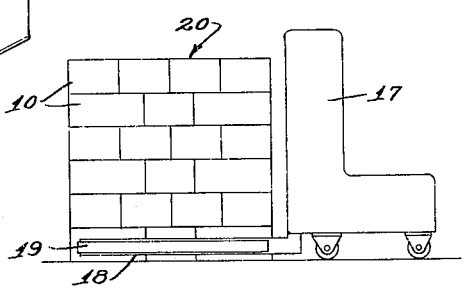
Fig. 5 is a diagrammatic view illustrating a lifting fork positioned for lifting a load of the articles.
Figure 4:
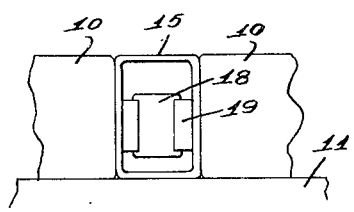
Fig. 4 is a fragmentary elevational view showing a gripping device in combination with a spacing tube.

The lifting truck 17 (Fig. 5) comprises a series of parallel, horizontal arms 18, positioned and arranged to be projected forwardly into the spacing tubes. The lifting fork 17 may be of the type known as a Cartwright lifting fork such as shown and described, for example, in the patent to Cartwright 2,530,375, November 21, 1950, Lifting Fork with Gripping Means. The lifting arms 18 may be equipped with gripping devices 19 (Fig. 4) which are expansible laterally under spring pressure, thereby applying pressure to the side walls of the tubes 15, such pressure serving to spread the side walls of the tube and to frictionally hold them in gripping engagement with the adjoining walls of the cartons 10. The cartons forming the lower course 12 are thus gripped and lifted together with the overlying cartons when the lifting fork is operated for lifting a load 20. The gripping devices 19 and the mechanism for operating them may be the same as the corresponding parts fully disclosed in the above-mentioned patent.

Figure 6:
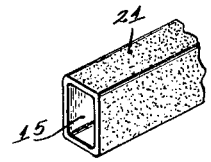
Fig. 6 is a perspective view of a spacing tube with a coating of a tacky or sticky substance applied thereto.
Figure 3:
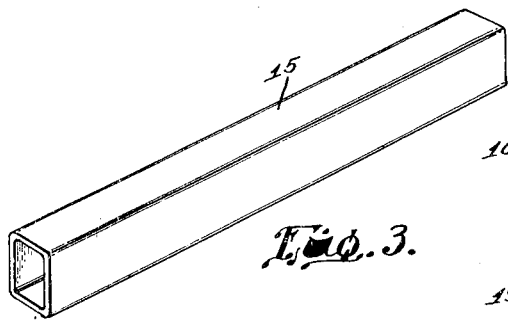
Fig. 3 is a perspective view of a spacing tube.

As shown in Fig. 6, a tacky, sticky or adhesive substance 21 may be applied if desired to the exterior surfaces of the spacing tubes to provide a more reliable holding connection between the tubes and the adjoining cartons and to prevent any possible slipping. This tacky coating 21 is such that the cartons or articles 10 are freely separated from the spacing tubes when desired.

As indicated in Figure 1, the units 20 are built for use with a lifting fork having four arms 18, including arms at the outer corners of the group and two intermediate arms. Spacing tubes or sleeves 15 are also shown for all of the arms. It is found, however, that with some types of cartons and in some situations the outer tubes 15 can be omitted, the inner tubes serving to prevent displacement of the individual cartons.

A method of using the lifting fork, for example, is as follows: The cartons 10 are arranged in self-retaining groups 20 which, if desired, may be lifted and stacked by means of the lifting fork 17 in a warehouse without disturbing the arrangement of the articles in the groups 20. Thereafter, the cartons may be transferred by a truck, a so-called "side-loading" method being practiced, in which one complete side of the truck is opened and the groups 20 of cartons are loaded thereon with the lifting fork which deposits one or more unit groups 20 of the cartons on the truck. The spacing sleeves or tubes 15 positively prevent any shifting of the cartons during transportation by the truck to an unloading station. A similar lifting fork is then used at the unloading station for unloading the cartons from the truck.

Modifications may be resorted to within the spirit and scope of my invention.

I claim:

1. A load comprising a multiplicity of articles of substantially rectangular form built into a unitary pile on a supporting floor, which pile is self-sustaining without lateral support and without support intermediate the pile and floor, the articles forming the lowermost course of the pile being seated directly on said floor and arranged in rows spaced apart to receive the lifting arms of a lifting fork, and spacing elements disconnected from each other, said elements being individual to and positioned within said spaces and seated on said floor, said elements being shaped to maintain the articles forming said lower course in position and preventing shifting of the articles.

2. The combination defined in claim 1, said spacing elements being in the form of tubes.

3. The combination set forth in claim 1, the spacing elements consisting of rectangular tubes having vertical side walls against which the adjoining articles in said lower course abut.

4. The combination set forth in claim 3, said elements having a tacky material forming exterior surfaces of said side walls for frictionally engaging the abutting articles.

5. The combination set forth in claim 3, the height of the said tubes being substantially equal to that of said course of articles.

6. The combination set forth in claim 2, including a lifting fork having arms projected into said tubes for lifting the load.

7. The combination set forth in claim 6, including laterally expansible means carried by the lifting arms and operable to transmit lateral pressure through the walls of the tubes to the adjoining articles, thereby gripping the articles and causing them to be lifted with, and as a part of, the load when the latter is lifted by said arms.

8. The combination set forth in claim 1, the said spacing elements being of hollow formation to receive the arms of a lifting fork and having expansible side walls abutting the adjoining articles in said lowermost course and expansible into gripping engagement with the said articles forming the said course and thereby permitting the entire said load to be lifted by a lifting force applied directly to the said spacing elements.

9. The combination of a multiplicity of rectangular articles of uniform size and shape, said articles being of greater length than width and being built into a rectangular pile resting directly on a supporting floor and forming a load which is self-sustaining without lateral support, the side walls of the pile being vertical, the pile being built in courses including a bottom course in which the articles are arranged in horizontal rows on said floor with the articles placed end to end, said rows being spaced apart, and rectangular spacing tubes separate from and independent of each other positioned between the rows and substantially equal in width to the spaces between the rows, the upper surfaces of said tubes being flush with the upper surfaces of the articles in said bottom course, the articles forming the second course being placed end to end in rows perpendicular to the rows forming said bottom course, the abutting ends of the articles in the second course being directly over the said spacing tubes and bridging the spaces between said tubes, the articles in each course above the bottom course being arranged with their abutting ends in staggered relation to the ends of the articles in adjoining courses.

References Cited in the file of this patent

UNITED STATES PATENTS

| 1,373,513 | Ladd | Apr. 5, 1921 |
| 1,922,560 | Sullivan | Aug. 15, 1933 |
| 2,609,113 | Huffman | Sept. 2, 1952 |

FOREIGN PATENTS

| 686,100 | Great Britain | Jan. 21, 1953 |